(12) United States Patent
Mattern et al.

(10) Patent No.: US 9,958,851 B2
(45) Date of Patent: May 1, 2018

(54) APPARATUS FOR THE AUTOMATED REMOVAL OF WORKPIECES ARRANGED IN A CONTAINER

(71) Applicant: Liebherr-Verzahntechnik GmbH, Kempten/Allgaeu (DE)

(72) Inventors: Thomas Mattern, Rieden (DE); David Haenschke, Altusried (DE); Berhard Riedmiller, Wertach (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 311 days.

(21) Appl. No.: 14/728,993

(22) Filed: Jun. 2, 2015

(65) Prior Publication Data

US 2015/0346708 A1    Dec. 3, 2015

(30) Foreign Application Priority Data

Jun. 2, 2014    (DE) .......................... 10 2014 008 108

(51) Int. Cl.

| G06F 7/00 | (2006.01) |
|---|---|
| G06F 19/00 | (2011.01) |
| G05B 19/19 | (2006.01) |
| B25J 9/00 | (2006.01) |
| B25J 9/08 | (2006.01) |

(Continued)

(52) U.S. Cl.
CPC ............ *G05B 19/19* (2013.01); *B25J 9/0084* (2013.01); *B25J 9/0093* (2013.01); *B25J 9/0096* (2013.01); *B25J 9/08* (2013.01); *B25J 19/021* (2013.01); *B25J 21/00* (2013.01); *G05B 2219/49223* (2013.01)

(58) Field of Classification Search
None
See application file for complete search history.

(56) References Cited

U.S. PATENT DOCUMENTS

| 9,827,676 B2 | 11/2017 | Mattern et al. |
|---|---|---|
| 2006/0108342 A1 | 5/2006 | Samodell et al. |

(Continued)

FOREIGN PATENT DOCUMENTS

| DE | 3413255 A1 | 10/1985 |
|---|---|---|
| DE | 3532305 A1 | 3/1987 |

(Continued)

OTHER PUBLICATIONS

United States Patent and Trademark Office, Office Action Issued in U.S. Appl. No. 14/728,526, dated Jan. 11, 2017, 27 pages.

(Continued)

*Primary Examiner* — Yolanda R Cumbess
(74) *Attorney, Agent, or Firm* — McCoy Russell LLP

(57) ABSTRACT

The present disclosure shows an apparatus for the automated removal of workpieces arranged in a container, having an object recognition device for detecting the workpieces and a gripper for gripping and removing the workpiece from the container and having a control for evaluating the data of the object recognition device, for path planning and for controlling the gripper. In this respect, the apparatus is set up in a modular manner by a handling module and a feed module, wherein the handling module has the gripper kinematics, in particular a robot or an area gantry, and the feed module has an arrangement for providing a container having workpieces.

19 Claims, 16 Drawing Sheets

(51) Int. Cl.
*B25J 19/02* (2006.01)
*B25J 21/00* (2006.01)

(56) References Cited

U.S. PATENT DOCUMENTS

| | | |
|---|---|---|
| 2008/0040911 A1 | 2/2008 | De Koning |
| 2008/0253871 A1* | 10/2008 | Bergeron .............. B23P 21/004 |
| | | 414/281 |
| 2009/0120920 A1 | 5/2009 | Gurney et al. |
| 2011/0258847 A1 | 10/2011 | Meisho et al. |
| 2013/0086801 A1* | 4/2013 | Mimura ................. B23P 21/00 |
| | | 29/720 |
| 2013/0213769 A1* | 8/2013 | Plakolm ................. B23Q 7/005 |
| | | 198/463.3 |

FOREIGN PATENT DOCUMENTS

| | | | |
|---|---|---|---|
| DE | 4212178 A1 | 10/1993 | |
| DE | 19519524 A1 * | 11/1996 | ............ B23P 19/001 |
| DE | 19519524 A1 | 11/1996 | |
| DE | 102008019102 A1 | 10/2009 | |
| DE | 202010015780 U1 | 3/2011 | |
| DE | 102009040951 A1 | 6/2011 | |
| DE | 102012005735 A1 | 9/2013 | |
| EP | 2111091 A2 | 10/2009 | |
| EP | 2679352 A1 | 1/2014 | |

OTHER PUBLICATIONS

United States Patent and Trademark Office, Notice of Allowance Issued in U.S. Appl. No. 14/728,526, dated Aug. 9, 2017 18 pages.

* cited by examiner

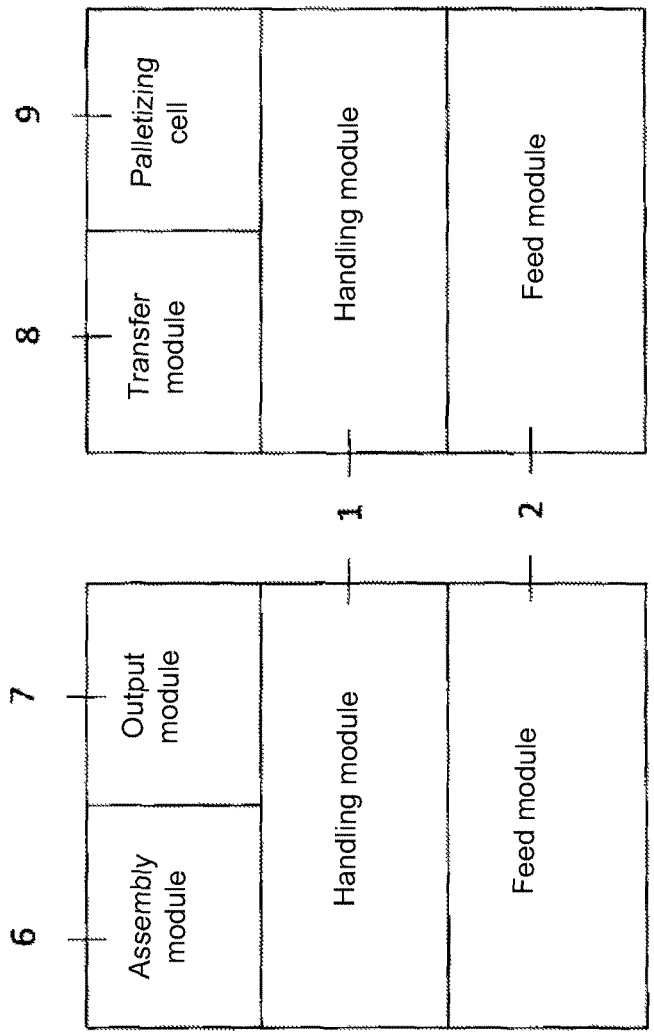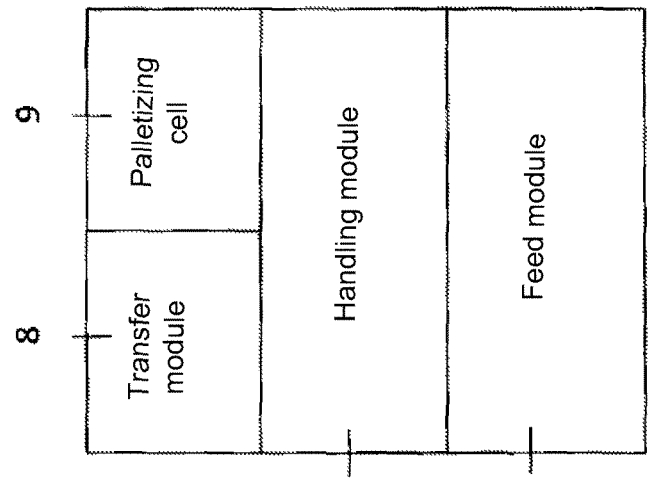

APPARATUS FOR THE AUTOMATED REMOVAL OF WORKPIECES ARRANGED IN A CONTAINER

CROSS REFERENCE TO RELATED APPLICATION

This application claims priority to German Patent Application No. 10 2014 008 108.7, entitled "Apparatus for the Automated Removal of Workpieces Arranged in a Container" filed on Jun. 2, 2014, the entire contents of which is hereby incorporated by reference in its entirety for all purposes.

TECHNICAL FIELD

The present disclosure relates to an apparatus for the automated removal of workpieces arranged in a container, having an object recognition device for detecting the workpieces and a gripper for gripping and removing the workpieces from the container and having a control for evaluating the data of the object recognition device, for path planning and for controlling the gripper.

BACKGROUND AND SUMMARY

Such an apparatus is known, for example, from EP 2 679 352 A1 which is incorporated in full as a subject matter of the present disclosure.

Such apparatus for the automated removal of workpieces arranged in a container have previously been individually planned, manufactured and assembled for the specific application in each case. The respective very specific circumstances can hereby be taken into account. However, this is associated with high costs and a great time effort.

It is therefore the object of the present disclosure to provide an apparatus for the automated removal of workpieces arranged in a container, the apparatus being able to be designed, manufactured and/or assembled in a simpler and less expensive manner.

This object is achieved in accordance with the present disclosure by an apparatus for the automated removal of workpieces arranged in a container having an object recognition device for detecting the workpieces and having a gripper for gripping and removing the workpieces from the container. The apparatus in this respect furthermore has a control for evaluating the data of the object recognition device, for path planning and for controlling the gripper. Provision is made in accordance with the present disclosure that the apparatus is structured in a modular manner from a handling module and a feed module. The handling module in this respect comprises the gripper kinematics, whereas the feed module has an arrangement for providing a container having workpieces. Both the design and the manufacture and assembly of apparatus for the automated removal of workpieces arranged in a container are substantially simplified by the modular construction in accordance with the present disclosure. The individual modules can in this respect in particular be planned, designed and preassembled separately. Furthermore, the same handling module can, for example, be equipped with respective different feed modules depending on which specific function is desired. Apparatus for the automated removal of workpieces arranged in a container can be so-to-say mass produced due to the modular construction. The gripper kinematics the handling module is equipped with is in this respect optionally a robot or an area gantry with which the gripper is moved. It can in particular be a six-axis robot in this respect.

The working space of the gripper of the handling module in this respect optionally extends beyond the base area of the handling module so that workpieces in the region of the feed module can be gripped.

The apparatus in accordance with the present disclosure can furthermore have an output module which has at least one workpiece placement area on which the workpieces are placed down in a separated manner and/or in a defined position. The apparatus is in this respect in particular structured such that workpiece can be removed from a container which is provided via the feed module by the gripper of the handling module and can be placed down on the workpiece placement area of the output module. The placing down can in this respect take place either directly or via buffer stations and/or further grippers. The output module in this respect optionally has a transport path for the workpieces using which the separated workpieces and/or the workpieces placed down in a defined position can be transported away and can be fed to further worksteps.

The apparatus in accordance with the present disclosure can furthermore have a machining and/or assembly module, with the machining and/or assembly module having an end placement area at which workpieces are placed down by a gripper of a handling module and can have a machining and/or assembly unit which machines and/or assembles the workpieces.

In this respect, the machined and/or assembled workpieces can optionally again be gripped by a gripper of a handling module and can be placed onto a workpiece placement area of an output module. The machining and/or assembly module can optionally, however, itself have a transport path for the transporting away of the machined and/or assembled workpieces and can thus represent a combined output module and machining and/or assembly module.

The machining and/or assembly module is in this respect optionally connectable to a handling module such as was presented in more detail above.

One or more of the above-described modules in accordance with the present disclosure optionally has a cell frame. The module can in this respect in particular have a base plate and/or cell walls. The cell walls may protect the working zone of the respective module from unauthorized access.

The handling module can in this respect in particular have a base plate on which the gripper and the gripper kinematics, in particular a robot or an area gantry, are arranged. Further advantageously, the handling module has at least two cell walls. Further advantageously, the handling module has at least one open side, optionally two open sides. The handling module can in this respect optionally be connected to a feed module at at least one open side. The handling module can further optionally be connected via a further open side to a machining and/or assembly module and/or to an output module.

The feed module optionally has a base plate and/or three cell walls, while one side remains open to be connected to the handling module.

The modules in accordance with the present disclosure optionally have mechanical connection points for connection to one another. The mechanical connection points can in this respect in particular be arranged at the cell frames. A mechanical connection of the cell frames of the handling module and of a feed module in accordance with the present disclosure in particular hereby becomes possible.

Furthermore, the individual modules can have electrical interfaces, pneumatic interfaces and/or hydraulic interfaces for connection to one another. In this respect, an electrical interface, pneumatic interface and/or hydraulic interface is/are in particular provided between a handling module and a feed module.

The individual modules can furthermore have an interface for connection to a production control system via which interface the operation of the modules can be coordinated with the operation of a further production system.

Interfaces can furthermore be provided between the individual modules and allow the coordination of the operation of the individual modules. A data exchange can in this respect in particular take place between the controls of the individual modules via the interfaces. Alternatively or additionally, the interfaces can allow the control of actuators of one module via a control of another module and/or can callow the evaluation of data of a sensor of one module via the control of another module.

The handling module can in this respect in particular have an electrical supply, a pneumatic supply and/or a hydraulic supply. The handling module furthermore optionally has an electrical interface, a pneumatic interface and/or a hydraulic interface by which further modules, and in particular a feed module, can be connected to the electrical supply, the pneumatic supply and/or the hydraulic supply of the handling module.

The control for evaluating the data of the object recognition device, for the path planning and for controlling the gripper is furthermore optionally arranged at the handling module. The control in this respect optionally has an interface via which an object recognition device can be connected which is arranged in the region of the feed module. The control can in this respect may obtain and evaluate sensor data which are generated via a sensor of the object recognition device via the interface. Provision can furthermore be made that the control arranged in the region of the handling module controls actuators of the feed module.

The handling module can in this respect have an operating module which is optionally accessible from an outer side of a cell wall of the handling module. In this respect, the control can optionally be accessed via the operating module. An input/output interface can in this respect in particular be provided, in particular a display or monitor and/or input devices such as a keyboard. The handling module can furthermore have a switch cabinet which is likewise optionally accessible from an outer side of a cell wall. The energy supply is optionally arranged in the switch cabinet.

The modular construction of the apparatus in accordance with the present disclosure in particular allows the same handling module to be connected to different feed modules and/or output modules to adapt the apparatus to the respective specifically desired function.

The handling module may in this respect be completely preassembled mechanically and/or electrically and/or pneumatically and/or hydraulically. In this respect, the gripper kinematics is in particular completely wired to the control and/or to the energy supply. The assembly work is hereby substantially reduced; the handling module optionally only has to be put down and connected to the mains supply in this respect.

The feed module is furthermore optionally completely preassembled mechanically and/or electrically and/or pneumatically and/or hydraulically so that it only still has to be connected to the handling module at the installation site.

The handling module and/or the feed module is/are in this respect advantageously transportable in a hanging manner or by a fork lift as complete units.

Possible embodiments of an apparatus in accordance with the present disclosure which are provided by different feed modules and/or output modules will be presented.

In a possible embodiment of the present disclosure, the arrangement for providing a container having workpieces of the feed module can be accessible from the outside. This accessibility in particular allows the introduction of full containers into the feed module and/or the removal of empty containers from the feed module.

The accessibility in this respect in particular allows the feed and removal of containers via a transport vehicle such as a fork lift. The arrangement for providing a container can in this respect in particular be accessible via a door which is arranged in a cell wall of a cell frame of the feed module.

Provision can furthermore be made that the arrangement for providing a container having workpieces can take up at least two containers. This makes it possible to continue work immediately with the second container after the emptying of a first container. Both containers are advantageously in the working space of the gripper of the handling module for this purpose.

In accordance with the present disclosure, the feed module can have a separating device via which a feed zone for one or more containers can be separated from a working zone, in particular from the working zone of the gripper. This makes it possible to remove an empty container or to feed a full container while a second container is being emptied. A hood can in particular be provided as the separating apparatus which is arranged in the feed module such that the feed zone can selectively be covered by it for one or the other container. The hood hereby separates the working zone of the gripper from the respective feed zone while it releases the other container for the gripper. The hood is in this respect optionally arranged movable at the feed module, in particular displaceable and/or pivotable. The hood can in particular be a displaceable hood, a pivotable flap or a roller blind.

In a further embodiment of the present disclosure, the feed module can cooperate with a driverless transport system.

In a further embodiment of the present disclosure, the arrangement for providing a container having workpieces of the feed module can be supplied with containers via an automatic container feed and/or removal path. Provision can in particular be made in this respect that the arrangement for providing a container having workpieces can take up at least two containers. Provision can, however, be made in this respect that the removal of workpieces is only possible from a single container or only in a single container position.

The feed module may have a transport arrangement for transporting the containers in the interior of the feed module. The transport arrangement can in this respect optionally cooperate with the automatic container feed and/or removal path.

It is furthermore conceivable that the transport arrangement within the feed module and the container feed and/or removal path are combined in one transport path.

In accordance with the present disclosure, a light barrier can be provided which secures the feed zone. It is optionally arranged in the transition zone between the feed station and the automatic container feed and/or removal path.

In a first variant, the arrangement for providing a container having workpieces of the feed module can in this respect have a transverse shuttle which cooperates with a container feed path and with a container removal path each having opposite transport directions. The container feed path can in this respect in particular feed full containers into the zone of the transverse shuttle. The containers are emptied in the zone of the transverse shuttle. The empty containers are then again transferred to the container removal path. The removal of the workpieces from the containers in this respect takes place in the zone of the transverse shuttle, with the transverse movement of the containers being able to take place before, during and/or after the removal of the workpieces. The light barrier in this respect may separate the feed zone or removal zone of the transverse shuttle from the container feed path and/or from the container removal path.

In an alternative embodiment, the arrangement for providing a container having workpieces of the feed module can have a rotary table on which the containers can be arranged, with the containers being travelable from a feed zone of the feed module into a working zone of the gripper of the handling module, or vice versa, by rotating the rotary table. The rotary table can in this respect be loaded with containers, for example, either via a transport vehicle such as a fork-lift, or containers can be removed in this manner. Alternatively, the rotary table can also cooperate with an automatic container feed path and/or removal path. The rotary table in this respect may have separating walls which separate the feed zone from the working zone.

In a further alternative embodiment, a transport path for containers can lead through the feed module. It can in particular be a transport belt on which the containers are traveled in a filled state into the zone of the feed module and on which they are also again removed from the feed module after the emptying in the zone of the feed module.

In a possible embodiment of the present disclosure, the feed module can also take over the transporting away of the workpieces in addition to the providing of the containers. In this case, the feed module forms a combination of a feed module and an output module. In this respect, only one transport path may be provided on which both the containers are transported in and away and the separated and/or positioned workpieces are transported away. In this respect, the containers having unordered workpieces and also palletizing baskets for receiving the separated and/or positioned workpieces can in particular be transported on the transport path. The palletizing baskets can in this respect in particular have nests for receiving the workpieces.

In further possible embodiments of the present disclosure, the apparatus can have a buffer station on which the gripper places the workpieces after the removal from the container, with the workpieces being able to be picked up from the buffer station by a gripper and placed down in an end placement area. The gripper which picks the workpieces from the buffer station can in this respect be the same gripper which also carries out the removal from the container or it can be a different gripper.

In a possible embodiment, the buffer station can in this respect be integrated into the handling module. Alternatively, the buffer station can be arranged in a buffer module. Such a buffer module can in this respect in particular be a cell frame at which the buffer station is arranged. The cell frame in this respect in particular has a base plate and at least one cell wall, optionally at least two cell walls.

The apparatus in accordance with the present disclosure can have two handling modules which can interact to remove workpieces from a container and to place them down on an end placement area. In this respect, a buffer station may be provided on which the gripper of the first handling module places down the workpieces after the removal from the container, with the workpieces being picked up from the buffer station by a gripper of the second handling module and being placed down in a workpiece placement area. The buffer station is in this respect may be arranged in a buffer module which is arranged between the two handling modules.

In a further embodiment of the present disclosure, the output module can comprise a palletizing cell and/or can interact with a palletizing cell. The workpieces can in this respect in particular be placed down by a handling module in accordance with the present disclosure in palletizing baskets of such a palletizing cell. The output module in this respect advantageously has a transport path and/or a transfer module via which the palletizing baskets can be transported to a palletizing cell.

In a further embodiment, the output module can furthermore interact with a pallet handling system, with the output module corresponding in a particular embodiment to the equipping and/or feed module of the pallet handling system.

In accordance with the present disclosure, a plurality of handling modules can be connected in parallel with other modules. In this respect, a plurality of handling modules can in particular interact with an output module, and in particular with a transport path for the transporting away of the separated workpieces. The handling modules in such an arrangement may have respective separate feed modules. It is, however, alternatively also conceivable to combine a plurality of handling modules with a single feed module, in particular with a transport belt for containers having workpieces, so that the handling modules can remove workpieces in parallel from respective different containers which are, however, arranged on the same transport path.

The present disclosure furthermore also comprises the individual modules such as have been described above in addition to the total apparatus.

The present disclosure in this respect in particular comprises a handling module for an apparatus such has been described above, having a gripper and gripper kinematics for the automated removal of workpieces arranged in a container. The gripper kinematics can in this respect in particular be a robot, in particular a six-axis robot, and/or an area gantry. The handling module in this respect comprises a control for evaluating the data of an object recognition device, for the path planning and for the control of the gripper. The control can in particular have an interface for connection to an object recognition device for this purpose.

The handling module can furthermore have an interface via which the operation of the handling module can be coordinated with the operation of at least one further module. The interface can in this respect allow a data exchange of a control of the further module in a first embodiment. Provision can alternatively or additionally be made that a control of actuators of a further module is possible via the interface and/or the utilization of sensor data from sensors which are arranged in a further module.

The handling module can furthermore have an interface to a production control system, via which interface the operation of the handling module can be coordinated with the operation of a production system.

The handling module in accordance with the present disclosure is in this respect optionally configured and structured as has already been presented in more detail above.

The present disclosure furthermore comprises a feed module for an apparatus such as has been presented above. The feed module in this respect in particular comprises an arrangement for providing a container having workpieces. The feed module furthermore has an object recognition device for detecting the workpieces in the container.

An interface to a handling module can furthermore be provided via which the data of the object detection device can be transferred to a control of the gripper. Alternatively or additionally, the interface can be used to coordinate the work of the arrangement for providing a container having workpieces with the movement of the gripper.

The feed module is in this respect configured as has been presented in more detail above with respect to the embodiments of the apparatus in accordance with the present disclosure.

The present disclosure furthermore comprises an output module, machining module and/or assembly module for an apparatus such as has been presented above. The output module, machining module and/or assembly module in this respect in particular have an end placement area on placed down in a defined position. If it is an output module, it may have a transport path for the workpieces. If it is a machining and/or assembly module, it may have a machining and/or assembly unit which machines and/or assembles the workpieces. The output module, machining module and/or assembly module may have an interface to a handling module via which the output module, machining module and/or assembly module can be coordinated with the operation of the handling module.

The output module, machining module and/or assembly module are structured in this respect as has been presented above with respect to the apparatus in accordance with the present disclosure.

The modules in this respect optionally each have cell frames having mechanical connection points via which they can be connected to one another.

The object detection, the path planning and the control of the gripper of the handling module take place in this respect as is known, for example, from EP 2 679 352 A1. The buffer station provided there does not, however, have to be necessarily implemented. The sensor arrangement can in this respect in particular be a 3D laser scanner. The object detection device in this respect in particular allows the detection of the individual workpieces in the container. A workpiece which is to be gripped can furthermore be identified in this respect as well as a corresponding path planning for controlling the gripper and/or the gripper kinematics.

The sensor arrangement of the object detection device is further optionally travelable in this respect, including optionally linearly travelable. The travel direction can optionally take place in parallel with a transport direction of a transport arrangement for transporting the containers within the feed arrangement.

The apparatus in accordance with the present disclosure for the automated removal of workpieces arranged in a container have been described above with respect to their modular structure.

The present disclosure protects the above-named apparatus for the automated removal of workpieces arranged in a container and in particular, however, also protects the different feed and/or output options to be used for this purpose independently of the modular construction in accordance with the present disclosure.

The present disclosure in this respect in particular relates to an apparatus for the automated removal of workpieces arranged in a container, having an object recognition device for detecting the workpieces and a gripper for gripping and removing the workpiece from the container and having a control for evaluating the data of the object recognition device, for path planning and for controlling the gripper. The apparatus in this respect comprises a feed device and a handling device. The handling device in this respect comprises gripper kinematics, in particular a robot and/or an area gantry. The feed device comprises an arrangement for providing a container having workpieces.

The feed device and a handling device are structured in this respect as has been presented above with respect to the feed module and/or to the handling module.

The apparatus in accordance with the present disclosure can furthermore have an output device which is structured as has been presented above with respect to the output module.

The feed device, handling device and output device, however, do not have to have a modular structure, but can rather be composed of individual components and/or can form an apparatus in another manner for the automated removal of workpieces arranged in a container.

The feed device of such an apparatus in accordance with the present disclosure can in this respect in particular have an arrangement for providing a container having workpieces. It is optionally accessible from outside from at least one side, in particular via at least one door. The arrangement for providing a container having workpieces can in this respect optionally receive at least two containers. Provision can furthermore be made that the feed device has a separating device via which a feed zone for one or more containers can be separated from a working zone of the gripper. A hood can in this respect in particular be provided which is arranged in the feed device such that it can selectively cover the feed zone for the one or the other container.

The feed device can alternatively be in communication with an automatic container feed and/or removal path, in particular as has been presented above with respect to the feed module in accordance with the present disclosure.

The feed device can in particular have a transverse shuttle, a rotary table or a transport path, in particular as has been presented above with respect to the feed module.

The feed device can furthermore also take over the transporting away of the workpieces in addition to the provision of the container, in particular as has likewise been presented above with respect to the feed module.

The apparatus in accordance with the present disclosure can furthermore have a processing and/or assembly device which is configured as has been presented above with respect to the machining and/or assembly module in accordance with the present disclosure.

The apparatus in accordance with the present disclosure can furthermore comprise a buffer station and/or a palletizing cell and/or can cooperate with a palletizing cell.

The control of the apparatus in accordance with the present disclosure optionally controls the individual components of the apparatus in an automated manner. To the extent that it has been described above that a component of the apparatus in accordance with the present disclosure can be operated in a specific manner, the control optionally has control routines for a corresponding automated control.

The present disclosure will now be described in more detail with reference to embodiments and to drawings.

BRIEF DESCRIPTION OF THE FIGURES

FIG. 2A shows a first variant of the modular construction in which an assembly module is additionally provided.

FIG. 2B shows a second variant in which the output module comprises a transfer module and a palletizing cell.

DETAILED DESCRIPTION

In a first aspect, the present disclosure relates to the modular structure of an apparatus for the automated removal of workpieces arranged in a container. Such apparatus have an object recognition device for detecting the workpieces present in the container and have a gripper for gripping and removing the workpieces from the container to place them down on an end placement area, optionally via one or more buffer stations. The apparatus furthermore has a control for evaluating the data of the object recognition device, for path planning and for a corresponding controlling of the gripper.

Such apparatus make it possible to separate unsorted bulk goods which are fed unordered in containers to a production unit or to a production and/or assembly line and thus to feed them to the further production.

Such apparatus in this respect typically require an adaptation to the requirements of the respective production unit or production and/or assembly line to satisfy the demands made by the different workpieces and/or by the feed and/or output of the workpieces. In this respect, the implementation previously had to be redesigned for each customer.

The present disclosure in contrast provides a modular structure for such an apparatus which provides an apparatus for the automated removal of workpieces arranged in a container without any complex and/or expensive individual constructions or at least with a reduction thereof, said apparatus optionally being able to be integrated into existing machining and/or production units.

Figure 1:
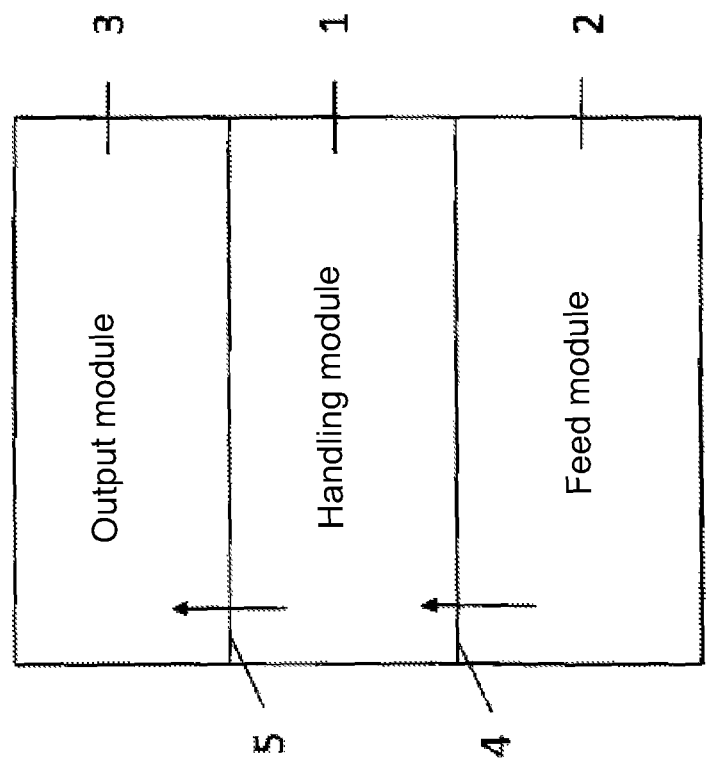
FIG. 1 shows a schematic representation of the modular construction in accordance with the present disclosure of an apparatus for the automated removal of workpieces arranged in a container and of a handling plant.

The modular construction in accordance with the present disclosure is shown schematically in FIG. 1 and divides an apparatus for the automated removal of workpieces arranged in a container into a central handling module 1 on which the gripper kinematics is arranged which is in particular a robot or an area gantry for moving the gripper. The handling module 1 is combined with a feed module 2 which has an arrangement for providing the containers having the workpieces. The arrangement of handling module 1 and feed module 2 is furthermore typically combined with an output module 3 on which the gripper of the handling module 1 places the workpieces down in a separated manner. The output module 3 in this respect typically has a transport path for transporting away the workpieces.

Respective interfaces 4 and 5 via which the individual modules are connected to one another are provided between the handling module 1, the feed module 2 and the output module 3. In this respect, it can be a mechanical interface. An electrical interface, a pneumatic interface and/or a hydraulic interface can furthermore also be provided. In addition, the interface can allow a coordination of the operation between the individual modules. An interface to a production system can additionally be provided.

In this respect, two variants of the basic modular construction shown in FIG. 1 are shown in FIGS. 2A and 2B. An assembly module 6 is provided in FIG. 2A in addition to the handling module 1, the feed module 2 and the output module 7. Workpieces can, for example, be machined thereat and/or assembly steps can be carried out at the workpieces. The workpieces can in this respect first be given by the handling module to the assembly module and can be given from it back to the output module 7 via the handling module.

A variant is shown in FIG. 2B in which the handling module 1 is in communication with a palletizing cell 9 via a transfer module 8. The transfer module can, for example, be a transport belt on which palletizing baskets can be transported to the palletizing cell. The workpieces can then first be placed down into the palletizing baskets in the region of the transfer module 8. The palletizing baskets are then transported into the palletizing cell 9 for which a corresponding transport device is optionally provided.

The transfer module can either be joined to a palletizing cell or it can be integrated as a transfer module in a palletizing cell and can thus provide a direct input into the palletizing cell.

The handling module which can be combined with different feed modules in this respect serves as the base unit for all variants of the apparatus in accordance with the present disclosure. The unit of handling module and feed module can then be expanded by different kinds of a removal module or can be attached to existing transport units, machining units and/or assembly units.

The modular structure makes it possible to meet the various, multi-variant demands of the customers with respect to production lines, machining lines and assembly lines without a respective complete new construction. The interfaces furthermore allow a simple and fast assembly on site since the individual modules are supplied preassembled and only have to be connected to one another at the assembly site.

In an embodiment of the present disclosure, the handling module 1 and the feed module 2 in particular each have a cell frame. The latter typically comprises a base plate as well as one or more cell walls which prevent unauthorized access to the working zone of the handling device with a set-up apparatus. The cell frames of the individual modules are in this respect connected to one another via mechanical connection points. Electrical interfaces, pneumatic interfaces and/or hydraulic interfaces can furthermore be provided for connecting the modules. The individual modules can in this respect in particular be delivered in a completely set-up manner and can then be connected to one another by a few manipulations.

The handling module 1 in this respect has the gripper kinematics in its basic equipment, i.e. an arrangement via which the gripper for removing the workpieces from the container and for placing them down on a buffer placement area or end placement area can be moved. A robot, in particular a six-axis robot, is in particular used for this purpose. Alternatively, however, an area gantry can also be used. The handling module furthermore has a corresponding control for the gripper kinematics and for the gripper. In the embodiment, the handling module furthermore has an operating module having a user interface via which the control can be accessed. An electrical supply, pneumatic supply and/or hydraulic supply can furthermore be provided, in particular in a switch cabinet. The user interface and the switch cabinet are optionally accessible from the outer sides of the cell walls.

The apparatus in accordance with the present disclosure for the removal of workpieces from the containers in this respect has an object detection device having a sensor. Said sensor is respectively arranged in the region of the feed module and can be arranged above a container to be emptied to detect the workpieces in the container. It is in this respect in particular a 3D laser scanner. The data of the sensor are in this respect evaluated to identify the individual workpieces and their positions and to determine a workpiece suitable for gripping. A track planning for the gripper or for its gripper kinematics, in particular for the robot 10, then takes place using the positional data of this workpiece. For this purpose, the sensor is in communication with the control of the handling module via an interface.

In the following, some variants will now be described how a handling module in accordance with the present disclosure can be combined with different feed modules and/or output modules.

Figure 3:
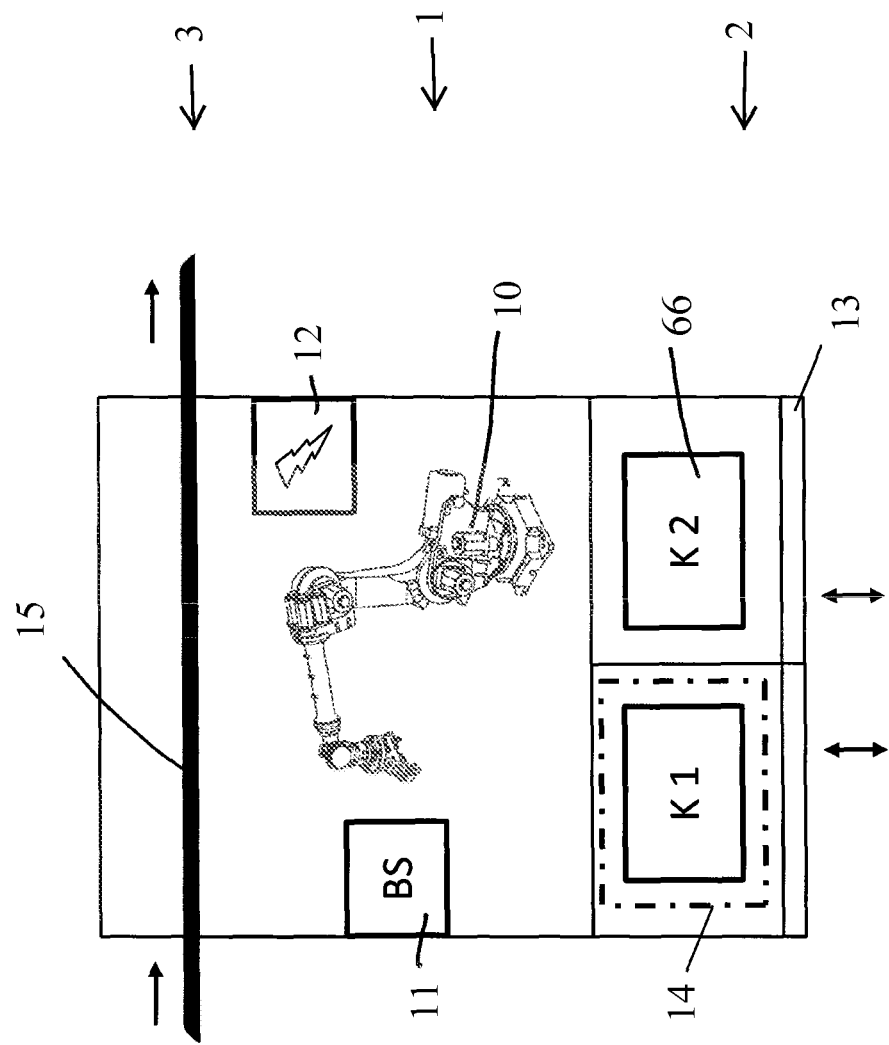
FIG. 3 shows a first embodiment of an apparatus in accordance with the present disclosure in which the containers can be traveled into the feed module via a transport vehicle.

In FIG. 3 in this respect, the handling module 1 is first shown which has a robot 10, the user interface 11 and the energy supply 12. The handling module 1 in this respect has two open sides via which it is in communication with a feed module 2 and with an output module 3.

In the embodiment shown in FIG. 3, the feed module 2 has two feed zones for containers which are arranged next to one another and which are each accessible from the outside via a door 13. The containers 66 can in this respect, for example, be introduced into or removed from the respective feed zone via a fork lift. To separate the feed zones for the containers from the working zone of the gripper, a hood 14 is provided which can selectively be pushed over the feed zone for the one or for the other container. If one of the two containers is thus completely emptied, the hood travels over it and thus releases the other container for the gripper. The gripper can thus seamlessly continue with the emptying. The now emptied container can now be removed without risk due to the hood 14 which covers the feed zone for said now emptied container and can be replaced by a full container.

In FIG. 3 a transport path 15 serves as the output module on which the workpieces removed from the containers can be placed down in a separated manner. The transport path can optionally have corresponding receivers for this purpose. It is a transport belt in the embodiment.

Figure 4:
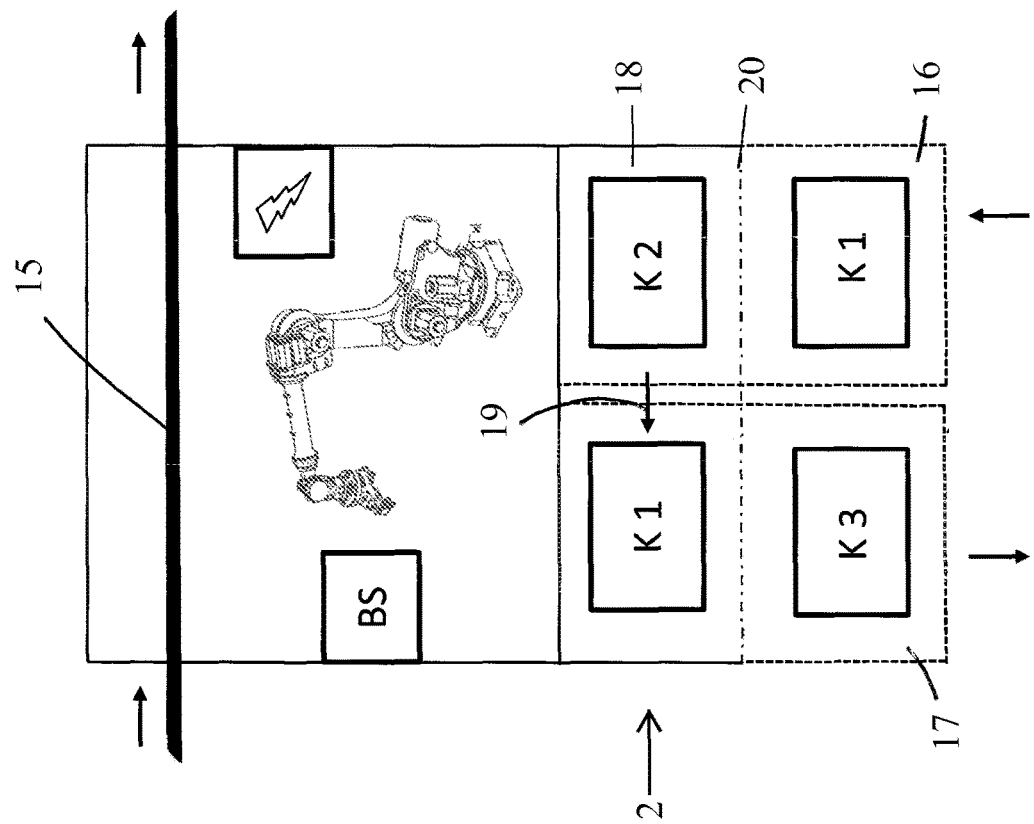
FIG. 4 shows a second embodiment in which the containers are fed in via an automated feed path and are removed via an automated removal path.

The embodiment shown in FIG. 4 differs from the embodiment shown in FIG. 3 by a differently designed feed module 2. The feed module is in this respect in communication with an automated container feed path 16 and with an automated container removal path 17 via which full containers can be fed and empty containers can be removed. The feed direction of the feed path 16 is in this respect opposite to the removal direction of the removal path 17.

A transverse shuttle 18 is therefore provided in the feed module 2 and containers can be traveled via it in the direction of movement 19 transverse to the feed direction or removal direction respectively. Containers are therefore transported from the feed path 16 into the feed zone of the feed module. The containers can be emptied there by the handling module. An emptied container is then traveled via the transverse shuttle 18 to a transfer zone for transferring to the removal path 17 from where the emptied containers are removed. Alternatively, a filled container can also first be transported via the transverse shuttle within the feed arrangement and the removal of workpieces from the container can only then take place. In the embodiment, a light barrier 20 is in this respect furthermore provided which is arranged between the feed module and the feed path 16 and/or the removal path 17. The light barrier in this respect prevents the access of persons into the region of the feed module.

Figure 5:
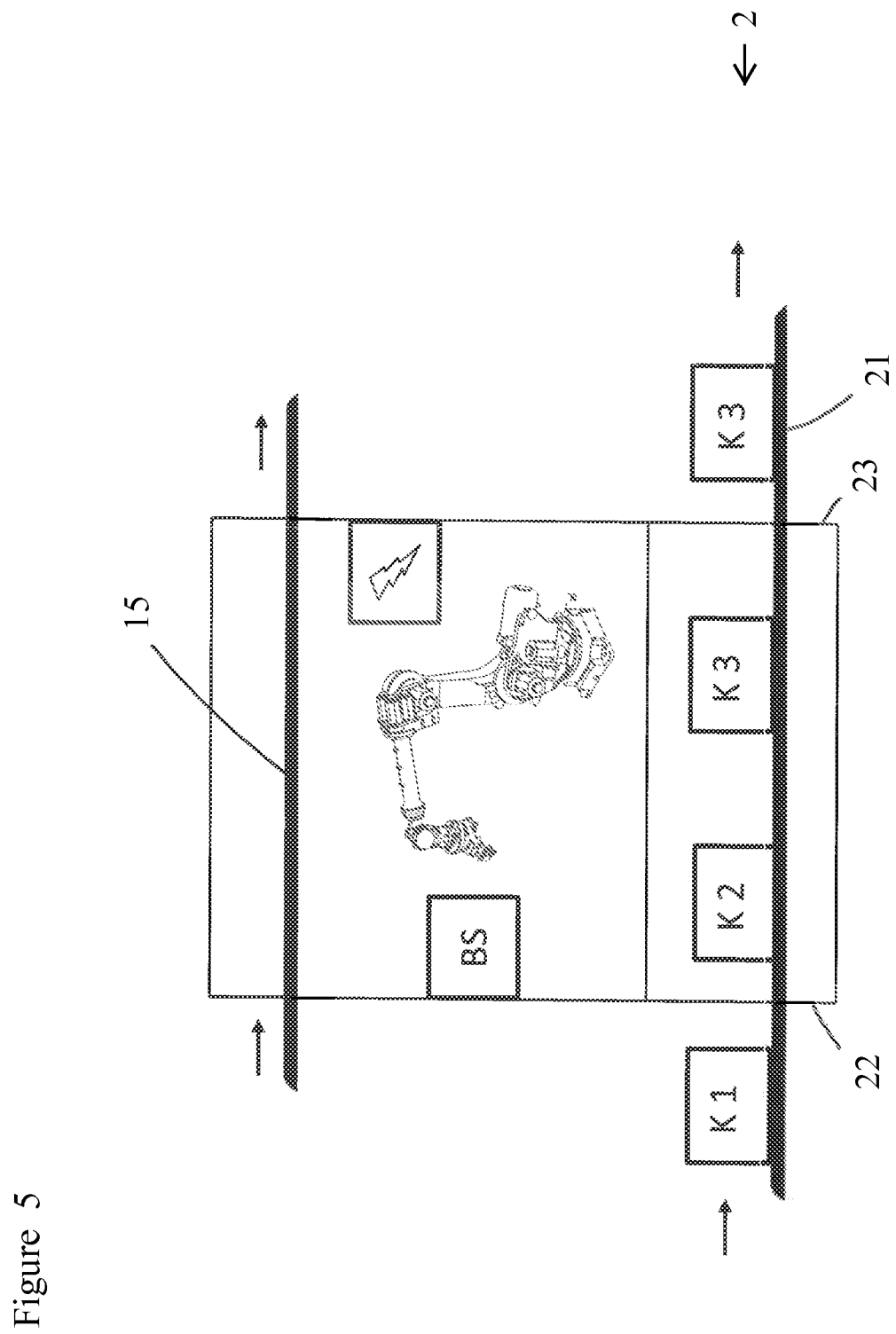
FIG. 5 shows a third embodiment in which a transport belt is used for feeding and removing the containers as well as a further transport belt for removing the workpieces.

In the embodiment shown in FIG. 5, a transport path 21 for the containers is provided as the feed module 2, in particular a transport belt, via which both the feed of full containers and the removal of emptied containers takes place. The feed and removal in this respect in particular take place without a change in direction simply by continued transport on the transport path. The feed module 2 in this respect optionally has openings on its narrow sides 22 and 23 through which openings the transport path with the containers passes.

Figure 6:
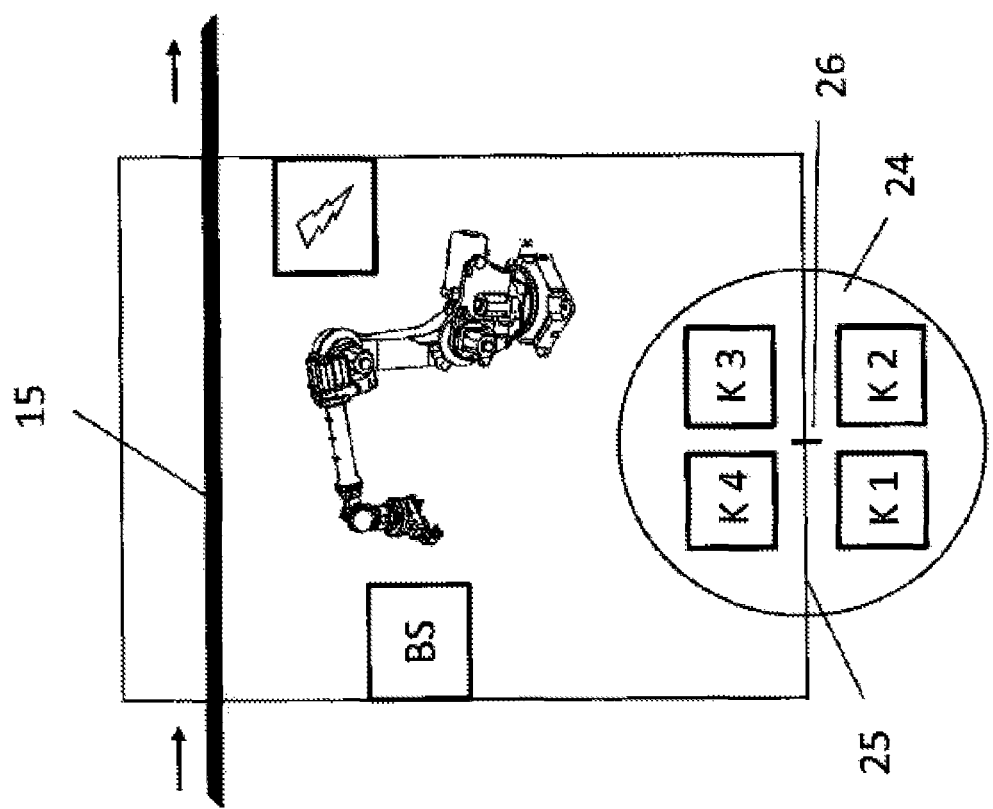
FIG. 6 shows a fourth embodiment in which the feed module has a rotary plate.

In the embodiment shown in FIG. 6, the feed arrangement has a rotary plate 24 on which a plurality of containers can be arranged. The rotary plate 24 is in this respect rotatable about a vertical axis of rotation 26 to bring the containers from a feed zone for the containers into the working zone of the handling module.

The rotary plate 24 in this respect optionally has a separating wall 25 which separates the working zone of the gripper from the feed zone for the containers. The feed and removal of the containers to and from the rotary plate can in this respect again take place via a transport vehicle, for example via a fork lift. Alternatively, such a rotary plate can also be automated with an automated feed path and/or removal path for the containers.

Figure 7:
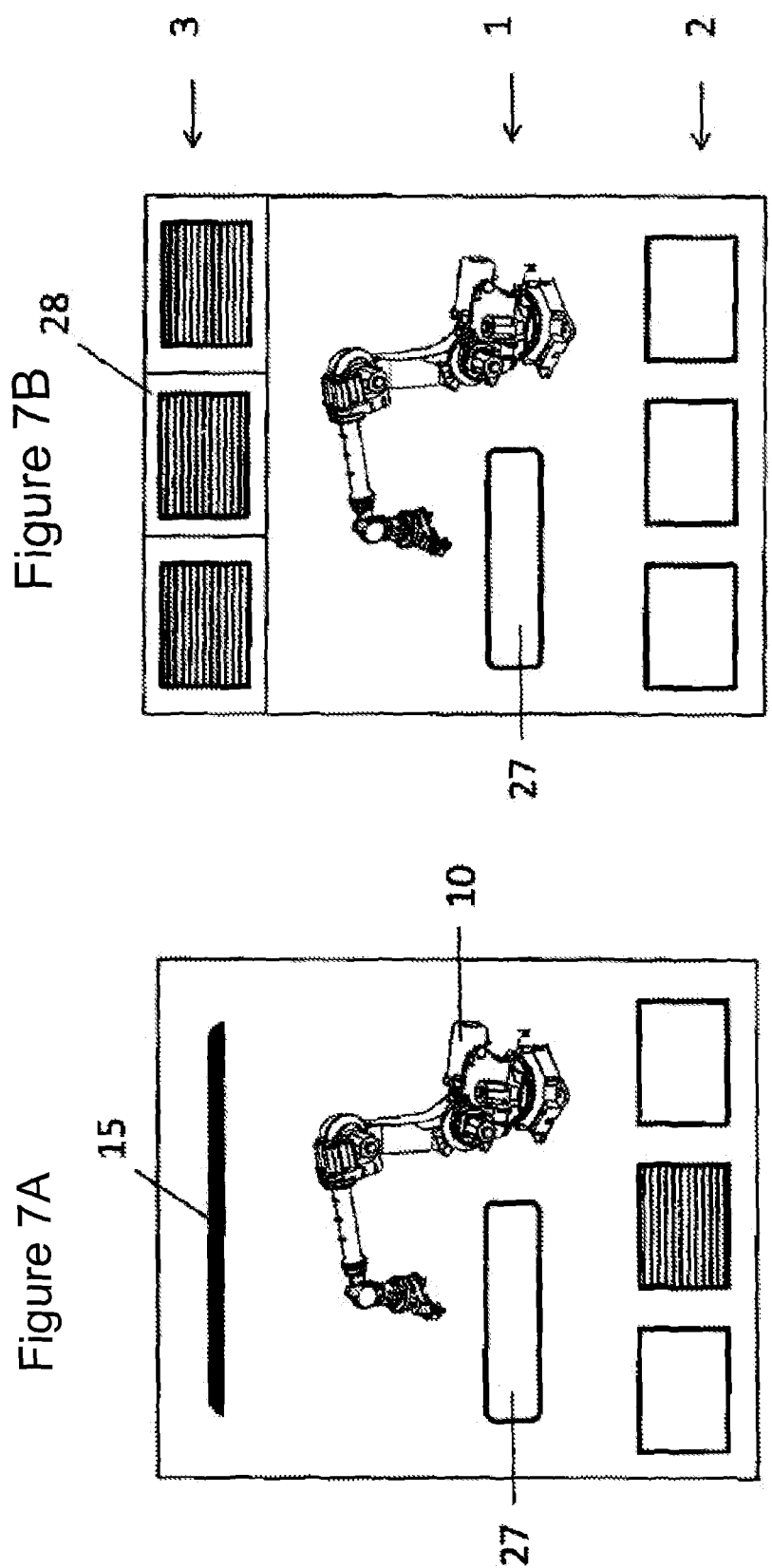
FIG. 7A shows a fifth embodiment in which a buffer station is provided.
FIG. 7B shows a sixth embodiment in which the output module is formed by a palletizing cell.

In the embodiments shown in FIGS. 7A and 7B, a buffer station 27 is furthermore provided in the zone of the handling module 1, on which buffer station the gripper of the handling module can place down, and optionally grip again, workpieces which have been removed from the containers in the region of the feed module. The buffer station in this respect in particular allows a more precise grip and thus a more precise laying down in the region of the output module. In this respect, any desired feed module can be used as the feed module 2 which is only shown schematically in FIGS. 7A and 7B. Any desired output module can furthermore also be used.

In this respect, a transport path 15 is again used as an output module in FIG. 7A. A palletizing cell 28 into which the workpieces can be placed is in contrast provided as the output module 3 in FIG. 7B.

Figure 8:
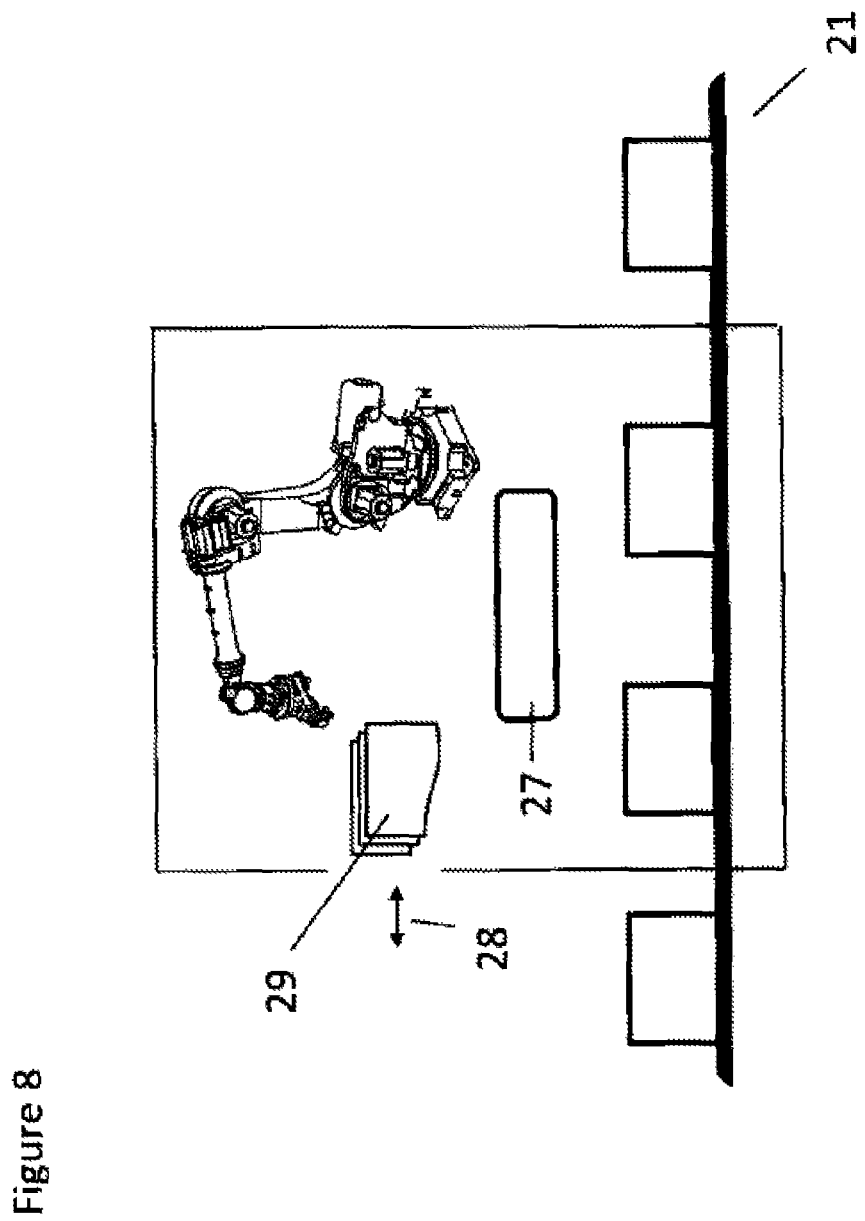
FIG. 8 shows a seventh embodiment in which the output module is in communication with a palletizing cell.

A further embodiment is shown in FIG. 8 in which the feed and removal of the containers take place via a transport belt 21. A buffer placement area 27 is furthermore provided here in the region of the handling module. The placing down in this respect takes place into palletizing baskets 29 which are traveled over a transport path 28 to a palletizing cell.

Figure 9:
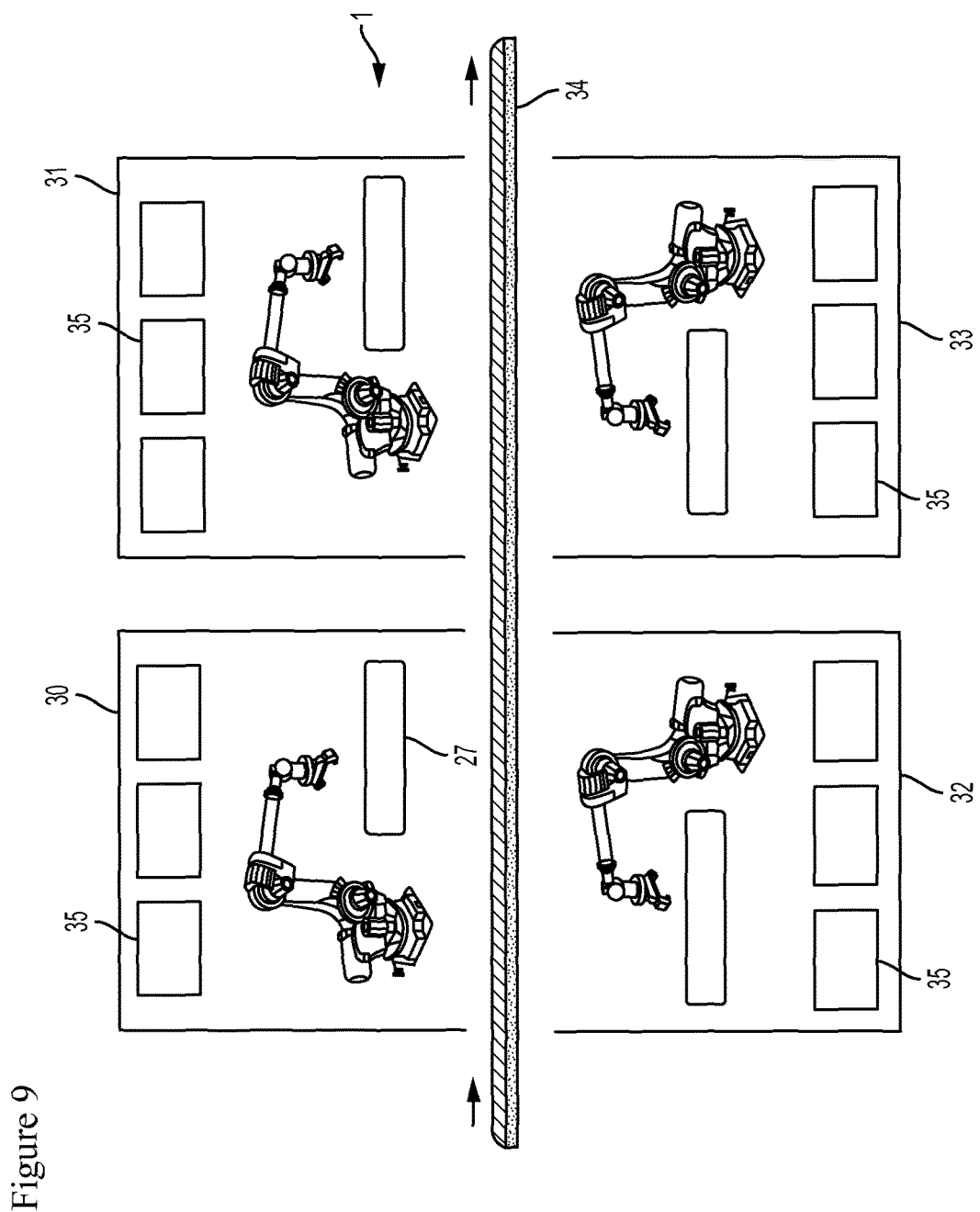
FIG. 9 shows an embodiment of an apparatus for the automatic removal of workpieces arranged in a container in which a plurality of handling modules place workpieces down in parallel on a common output module.

An arrangement is shown in FIG. 9 in which a plurality of handling modules 1 are combined with a single output module 34, in the embodiment again a transport belt. The handling modules in this respect work in parallel and place respective separated workpieces on the output module 34. In the embodiment, the individual handling modules 1 are in this respect each combined with separate feed modules 35 and thus form removal units 30 to 33. In this respect, a respective two removal units 30 and 32 are provided on oppositely disposed sides of the transport belt 34 in the embodiment so that the loading takes place from oppositely disposed sides. A respective two removal units are furthermore provided after one another along the transport belt 34.

Figure 10:
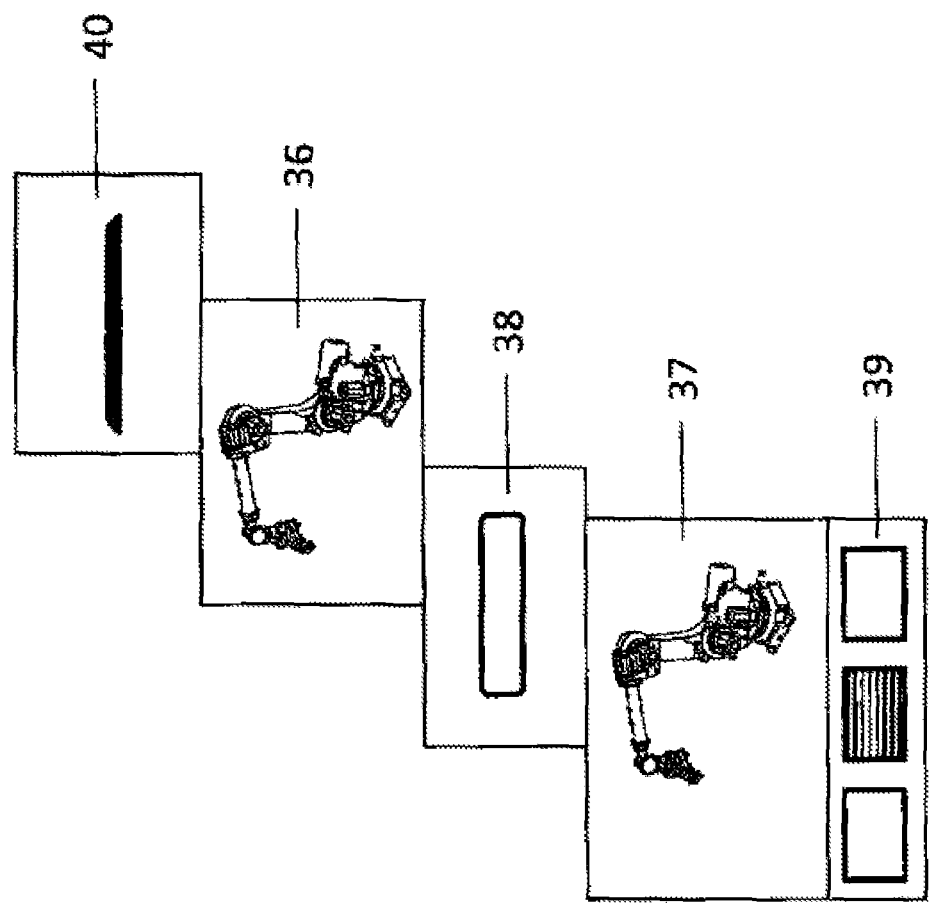
FIG. 10 shows a further embodiment in which a buffer module having a buffer station is interpose between two handling modules.

An embodiment is shown in FIG. 10 in which a plurality of handling modules are likewise used. They are in this respect, however, connected in series so that the workpieces are each handled after one another by two different handling modules. This in particular allows an increase in the gripping precision in the placing down on the end placement area. In the embodiment, the handling modules 36 and 37 are in this respect provided which are combined with a buffer station via a buffer module 38. The individual modules can in this respect, as shown schematically in FIG. 10, be combined in an offset manner, but optionally in an aligned manner. The arrangement of the two handling modules 36 and 37 and of the buffer module 38 is then combined with a feed module 39 and an output module 40. The first handling module 37 in this respect removes workpieces from the containers in the region of the feed module 39 and places them down on the buffer station of the buffer module 38 from where they are gripped again via the second handling module 36 and are placed down in the region of the output module 40.

In a further possible embodiment of the present disclosure, the feed module can cooperate with a driverless transport system.

Figure 11:
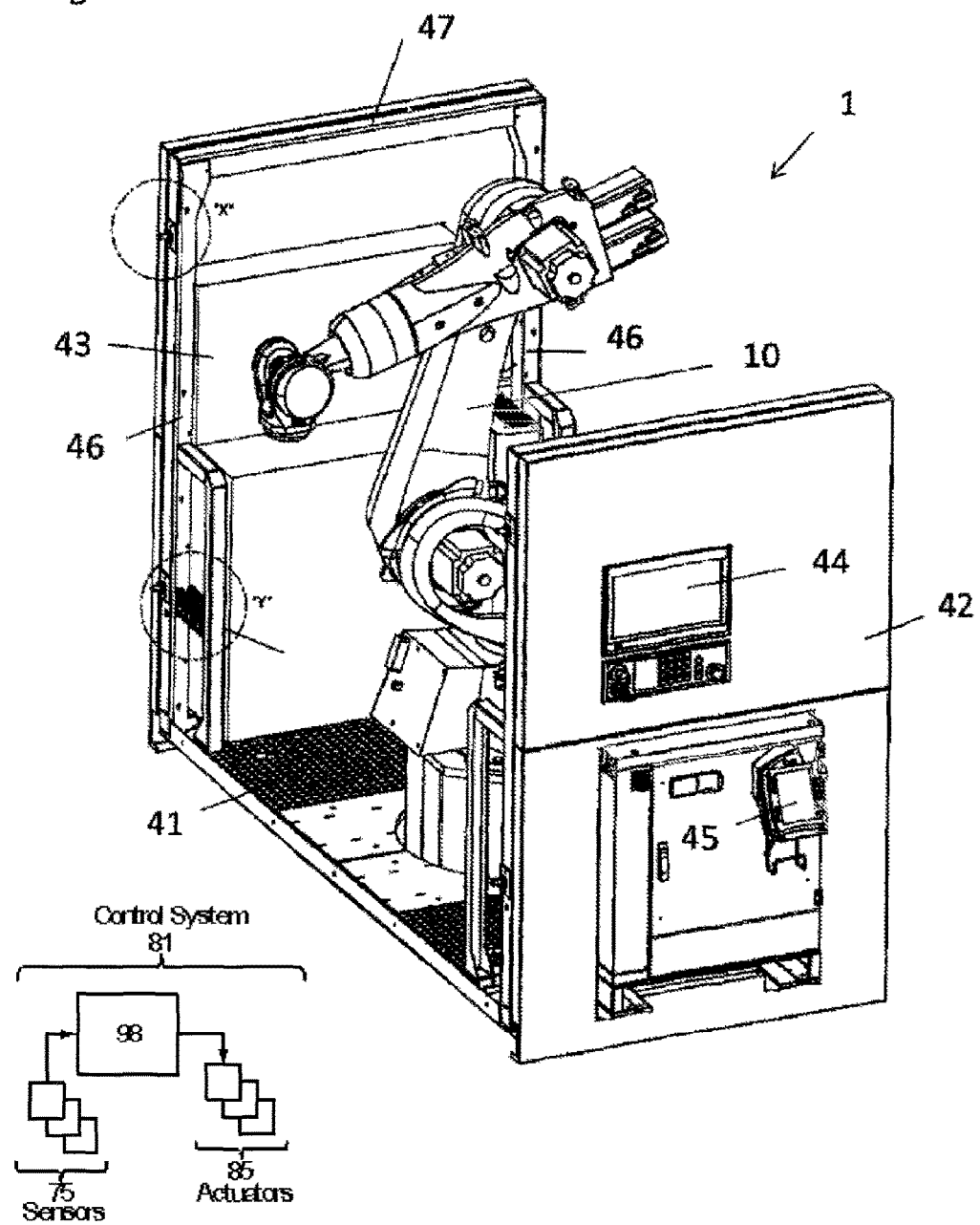
FIG. 11 shows an embodiment of a robot module in accordance with the present disclosure or of a handling module in accordance with the present disclosure.

An embodiment of a robot module in accordance with the present disclosure is shown in FIG. 11 which can, for example, be used as a handling module in an apparatus in accordance with the present disclosure for removing workpieces from a container such as has been presented above. The robot module can, however, also be used independently of this application in a variety of working areas.

The robot module 1 comprises a cell frame which comprises a base plate 41 and the cell walls 42 and 43. The robot 10 is in this respect mounted on the base plate. The robot 10 is a six-axis industrial robot in the embodiment.

The base plate 41 is in this respect rectangular, with the two cell walls 42 and 43 being arranged on oppositely disposed narrow sides of the base plate 41. The two longitudinal sides of the robot module are open in contrast. The working zone of the robot 10 extends beyond the zone of the robot module through the open sides into the adjacent zone. The robot module 1 can hereby be combined with further modules which provide or take up workpieces, for example, which are machined and/or handled by the robot.

The cell walls are in this respect made up of corner struts 46 in the embodiment which are connected to one another via transverse struts 47. The cells walls furthermore have a lining. The cell walls in this respect prevent the access to the working zone of the robot 10.

A control module for the robot is integrated into the robot module. The robot module furthermore has a user interface which is arranged at an outer wall of the cell wall 42 in the embodiment. The interface in this respect has a display 44 and input elements. A touchscreen 45 is furthermore provided as an input/output element. The control module can be accessed and in particular the movement of the robot controlled via the user interface.

The robot module furthermore has an electrical supply, pneumatic supply and/or hydraulic supply 12 which is accessible from the outside via a switch cabinet arranged in the region of the other cell wall 43. It is in this respect in particular an energy supply not just for the robot or the robot module, but rather also for further modules which can be connected via corresponding interfaces.

The robot module in accordance with the present disclosure can be connected to further modules to form a machining unit, assembly unit and/or handling unit. The further modules optionally also have a cell frame which can be mechanically connected to the cell frame of the robot module.

The cell frame of the robot module shown in the embodiment in this respect has mechanical connection points 48 for connection to further modules. They are provided at the corner struts 46. In the embodiment, these are screw domes 49 which can be pushed through corresponding openings in the cell frame of a further module and can be screwed thereto.

Further modules for the energy supply can furthermore be connected to the robot module. A pneumatic and/or hydraulic interface 50 is provided for this purpose via which a further module can be connected to the hydraulic and/or pneumatic supply of the robot module.

In this respect, if the robot module has a hydraulic supply, it optionally comprises a pump which provides high-pressure hydraulic fluid. If a pneumatic supply is provided, it optionally comprises a compressor which provides compressed air.

The electrical connection of a further module can furthermore also take place via the electrical supply of the robot module. An electrical interface is optionally also provided for this purpose.

An interface to the control module of the robot can furthermore be provided via which the operation of the robot module can be combined with the operation of other modules.

In a first embodiment, the further module can in this respect itself have a control which communicates, optionally communicates bidirectionally, with the control module of the robot module 1 via the interface.

In an alternative embodiment, the control of actuators of a further module can also take place via the control module of the robot module. Sensor data of sensors which are arranged in a further module can furthermore be evaluated via the control module of the robot module.

A combination of the above-named variants of an interface is furthermore also conceivable.

The robot module is built up so that it can be delivered to the installation site in a completely pre-assembled manner as a construction unit. In this respect, the cell frame can optionally be stiffened for transport via a longitudinal strut which connects the cell walls to one another in their upper regions. The transport of the robot module can in this respect take place either in a hanging manner, for example in that hooks are connected to the longitudinal strut or to the cell walls or in that the robot module is transported in a manner hanging at the robot. Alternatively, the robot module can, for example, be transported via a fork lift which grips beneath the base plate.

The robot module in this respect already has a complete wiring of the robot to the control module, to the energy supply and to the user interface. Only a few assembly steps thereby have to be carried out at the installation site.

The further modules are optionally also pre-assembled accordingly and only have to be mechanically connected to the robot module and connected via the corresponding interfaces to the energy supply and/or to the control module of the robot module.

Figure 13:
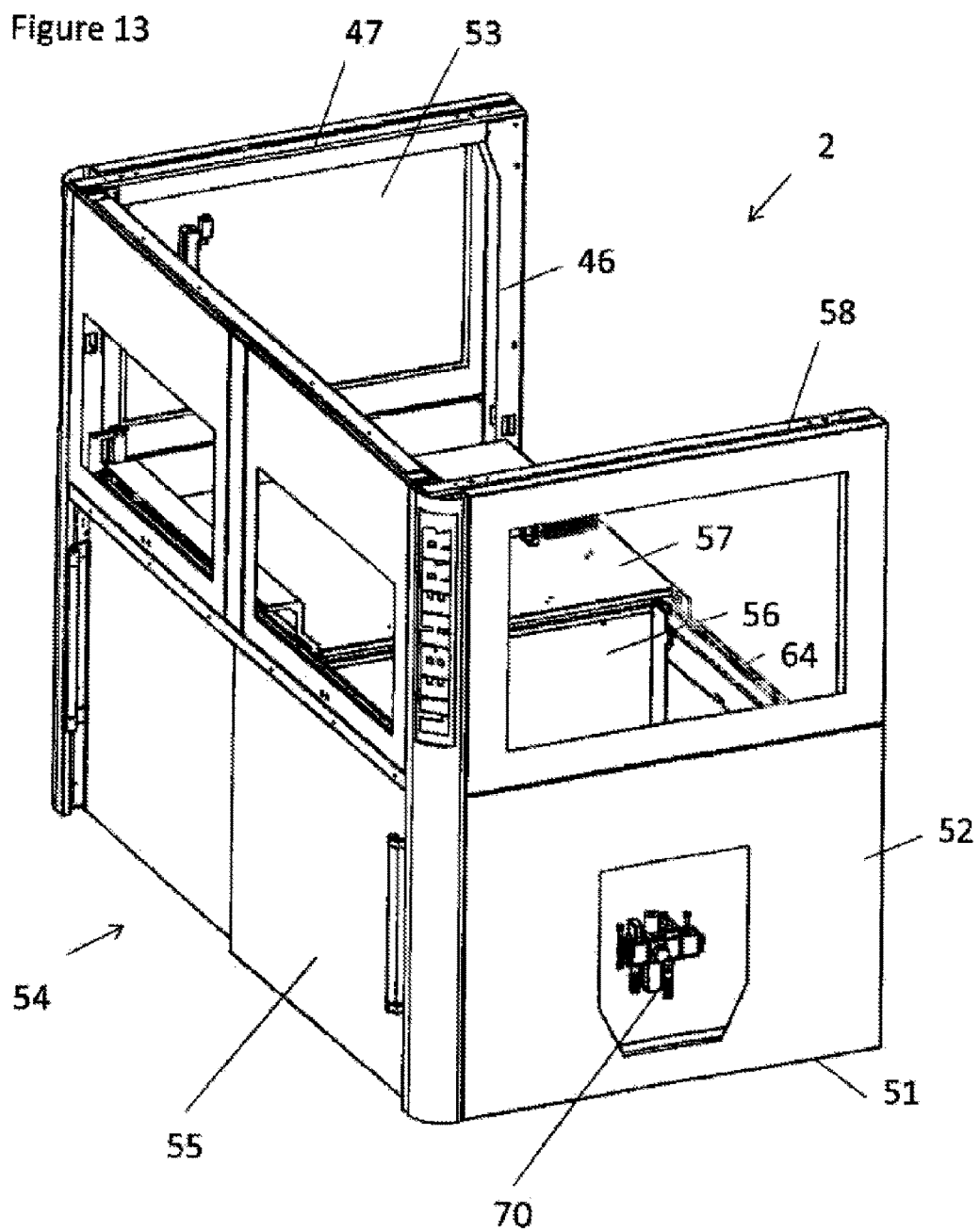
FIG. 13 shows an embodiment of a feed station in accordance with the present disclosure.

An embodiment of a feed module is shown in FIG. 13 which can be connected to the robot module 1 in accordance with the present disclosure which in this case works as a handling module. The feed module 2 and the robot module or handling module 1 in this respect optionally form an apparatus for the removal of workpieces arranged in a container, in particular for the removal of workpieces arranged in a container in an unordered manner.

The feed module 2 in this respect likewise has a cell frame which can be connected to the cell frame of the handling module 1. In this respect, the cell frame has a base plate 51 as well as cell walls 52, 53 and 54. One side of the feed module is open in contrast and is connected to an open side of the handling module so that the robot 10 can work in the region of the feed module.

The cell frame of the feed module in turn has corner struts 56 which are connected to one another via transverse struts 47 and longitudinal struts. Covers or windows are furthermore also provided here which protect the region of the feed module from unauthorized access.

Figure 12A:
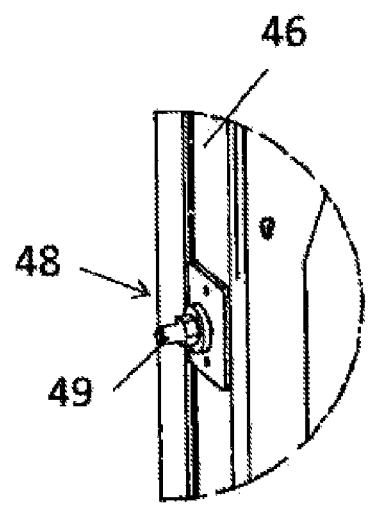
FIG. 12A shows a detailed view of the mechanical connection elements provided in FIG. 11.

The corner struts 46 arranged at the open side of the cell frame can in this respect be mechanically connected to the corner struts 46 of the cell frame of the robot module, in particular via the fastening points shown in FIG. 12A.

Figure 12B:
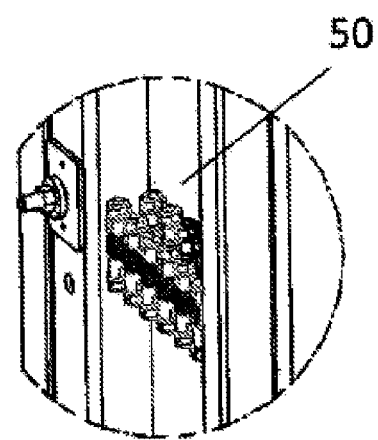
FIG. 12B shows a detailed view of the pneumatic connection elements provided in FIG. 11.

The connection to the energy supply of the robot module takes place via the interface 50 which is shown in FIG. 12B and which is connected to a corresponding interface 70 of the feed module. The interface 70 of the feed module is in this respect arranged in the interior of the feed module and is accessible via a door in an outer wall. Sensors and/or actuators of the feed module can furthermore be connected to the control module of the robot module via an electronic interface, not shown.

The feed module 2 is likewise completely pre-assembled and has a complete wiring which only makes a connection to the interfaces of the robot module necessary. The feed module can in this respect, for example, be hung from a hook via the bores 48 and can be transported in a hanging manner. Alternatively, a transport via a fork lift is also conceivable here.

Figure 14:
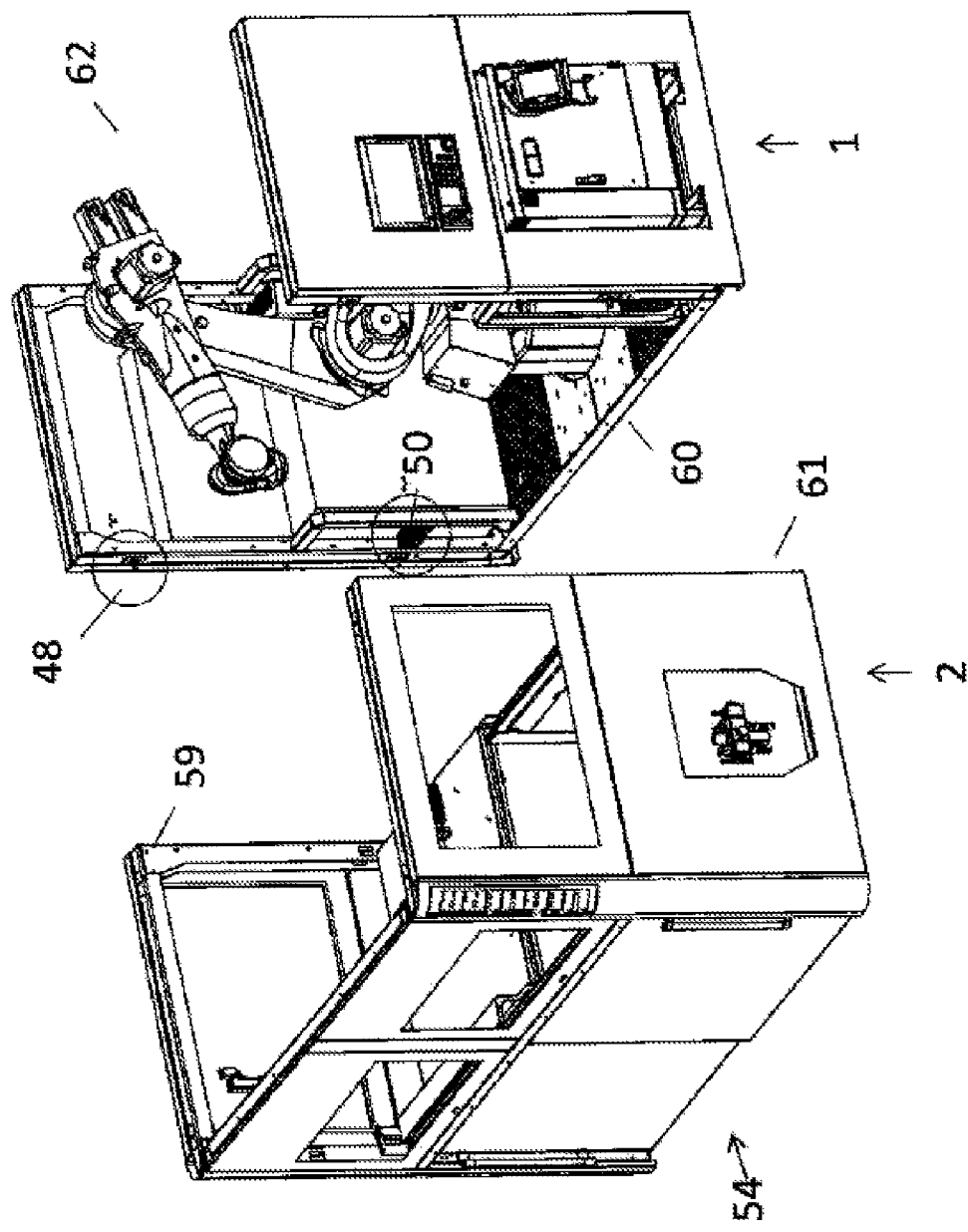
FIG. 14 shows the combination of the embodiment of a robot and/or handling module in accordance with the present disclosure shown in FIG. 11 with the feed module shown in FIG. 13.
Figure 15:
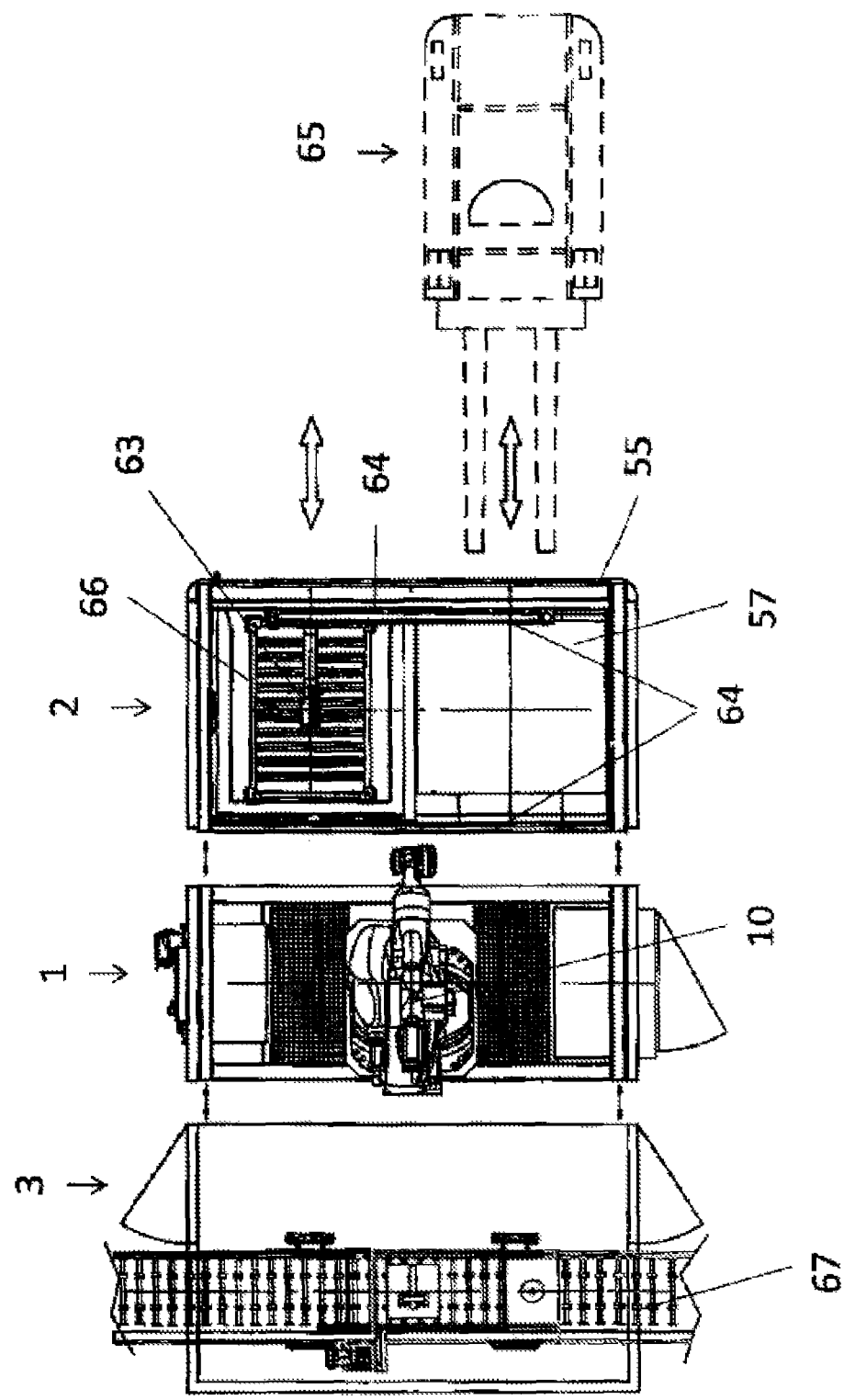
FIG. 15 shows a representation of an embodiment of an apparatus in accordance with the present disclosure for the automated removal of workpieces arranged in a container or of a combination in accordance with the present disclosure of a robot and/or handling module, of a feed module and of an output module.
Figure 16:
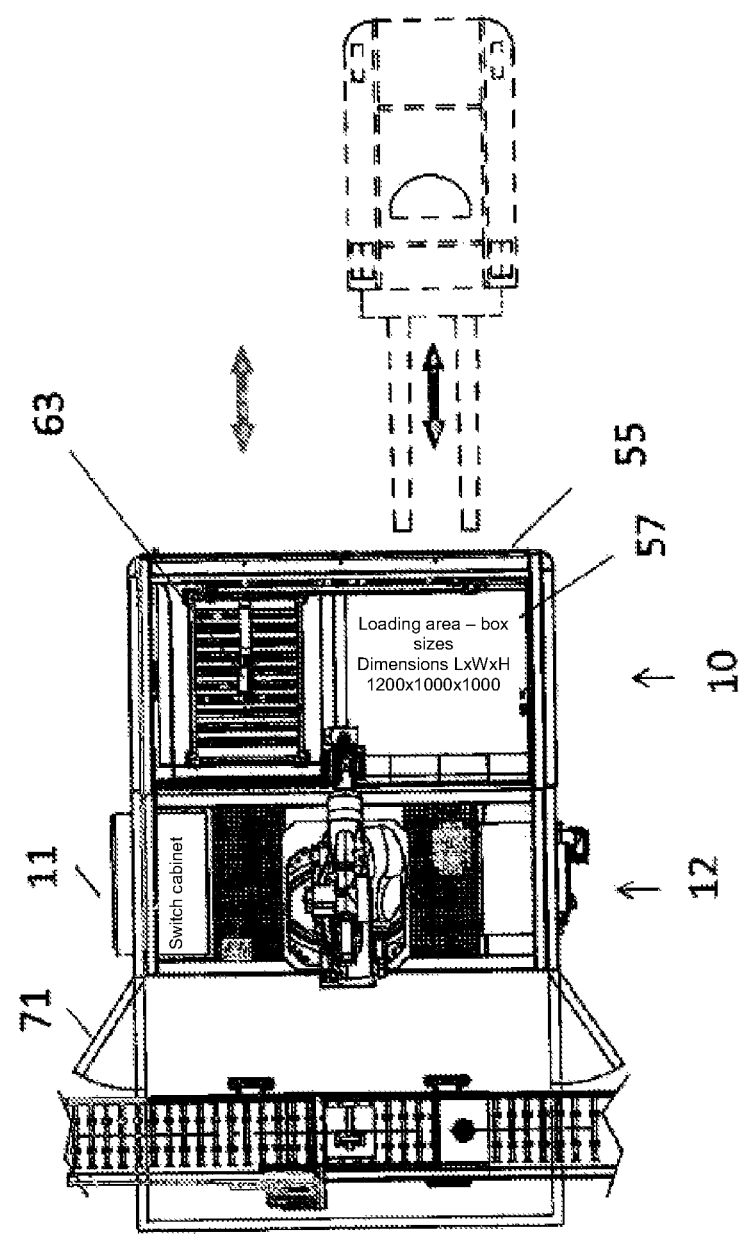
FIG. 16 shows the combination of modules shown in FIG. 15 in its assembled arrangement.

In FIGS. 14, 15 and 16, the combination of the handling module 1 and of the feed module 2 is now shown which together form an apparatus for the removal of workpieces from containers 66. The handling module 1 is in this respect furthermore connected at its free side disposed opposite the feed module to an output module 3 which will be looked at in more detail later.

The feed module in this respect forms a feed arrangement for the provision of containers from which the robot can remove workpieces which can also be used independently of the modular structure in accordance with the present disclosure. However, the above-described modular structure is particularly optionally provided here.

The feed arrangement formed by the feed module is in this respect accessible at a side for the provision and removal of containers. In the embodiment, sliding doors 55 are provided for this purpose which are let into the cell wall 54. Two feed zones provided next to one another in the feed arrangement are hereby accessible for a respective one container. The containers can in this respect be introduced into the feed arrangement via a fork lift 65 or can be removed therefrom after the emptying.

The provision of two containers in this respect has the advantage that after the emptying of a first container the apparatus can immediately start with the emptying of the second container without the removal operation having to be interrupted to replace the container. The empty container can rather be removed and can be replaced by a full container while the other container is emptied.

However, a separation of the feed zones for the containers from the working zone of the gripper with which the workpieces are removed from the container is required for this purpose. For this purpose, a displaceable hood 57 is provided which can be pushed either over the feed zone for the first container or over the feed zone for the second container and thus separates it from the working space of the gripper.

The doors 55 are in this respect optionally configured such that they can only be opened when the feed zone associated with the respective door is separated from the working zone of the gripper via the displaceable hood 47. It is hereby ensured that there is no risk of injury on the removal and setting of a container into the feed arrangement.

The apparatus in accordance with the present disclosure for the removal of workpieces from the containers in this respect has an object detection device having a sensor 63 which can be arranged above the respective container and which detects the workpieces in the container. It is in this respect in particular a 3D laser scanner. The data of the sensor arrangement are in this respect evaluated to identify the individual workpieces and their positions and to determine a workpiece suitable for gripping. A t planning for the gripper or for its gripper kinematics, in particular for the robot 10, then takes place using the positional data of this workpiece.

The sensor arrangement 63 is in this respect arranged travelable in the feed arrangement. A travel arrangement 64 is in particular provided for this purpose along which the sensor 63 can selectively be arranged above the first and second containers. This has the advantage, on the one hand, that only one sensor arrangement for detecting the workpieces has to be used since it can be traveled over the respective container in dependence on the container which is to be emptied. On the other hand, the sensor arrangement can be traveled away out of a region above the container after the workpieces have been detected so that the working zone of the gripper is not restricted by the sensor arrangement. After a workpiece has been removed, the sensor arrangement is then traveled back over the container to detect the remaining workpieces.

In the embodiment of the present disclosure, in which the total control electronics for the gripping from the container is arranged in the region of the robot module 1, the sensor arrangement 63 is connected to the control module of the robot module, with the data of the sensor module being evaluated via the control module.

The handling module is, as shown in FIGS. 15 and 16, connected to an output module on the open side disposed opposite the feed module. In the embodiment, it also has a cell frame which is connected to the cell frame of the handling module 1. The output unit in this respect has a transport path on which the gripper of the handling unit places down the workpieces removed from the container. The transport path is in this respect a roller belt. Nests into which the workpieces are placed can optionally be transported thereon. The cell frame of the output module also protects here against unauthorized access to the working zone of the robot 10. Doors 71 are provided for maintenance work via which the interior of the cell formed by the feed module, the handling module and the output module can be entered.

Due to the modular structure, the apparatus in accordance with the present disclosure for the removal of workpieces from a container can be used in a plurality of different areas with only small construction and assembly effort. The handling module in accordance with the present disclosure can in this respect in particular be combined with output units already present at the customer side so that only a corresponding connection of the handling module has to be designed for new, in particular via construction of a cell frame. The handling module can furthermore also optionally be combined with already present feed modules.

The robot module in accordance with the present disclosure can, however, also be used in other applications for a simple and inexpensive setup of a robot cell. It can in this respect in particular be combined with machining and/or assembly modules.

In one example, the various modules and/or interfaces may include control routines stored in memory of an electronic control system 81 communicatively coupled with sensors 75, actuators 85, and/or displays for receiving data including input information, sensor information, and for sending actuator control and/or display information. The electronic control system may include a processor and memory 98, in combination with sensors and actuators, to carry out the various controls described herein.

In one example, a robot module is provided, comprising: a cell frame and a robot, wherein the cell frame has a base plate on which the robot is mounted (with vertical being in the direction of the arrow shown in FIG. 14 above label 1) and has at least one cell wall connected to the base plate, and wherein the robot module is equipped with a control module for the robot.

The cell frame may be comprised of planar walls with at least two side walls facing each other and parallel to one another but each perpendicular to the based plate, the walls at least as vertically tall as a lower motorized joint of the robot, the robot having at least a first and second motorized joint connected to one another. The planar walls may include an electronic display and user interface as well as a viewing window (as shown by the see-through cut-outs in FIG. 13). A feed module may also be provided also having a base plate and at least two planar side walls similar to the robot module. As the cell frame can have mechanical connection points for connection to further modules, each of the plurality of modules has common connecting points to provide modular connectivity. In this way, a system of modules may be provided, with each module in the system having common and complementary connection points in terms of physical location on the cell/walls as well as in terms of shape. Further, various methods of operation as described herein may be carried out by operating the robot in the cell in relative position to the one or more further modules, such as a feed module as illustrated in FIG. 14, where the robot is operated in coordination with other actuators such as those of the feed module.

FIGS. 11-16 are drawn approximately to scale, although other relative dimensions may be used, if desired. FIG. 11 further includes an example control system which may include the controls as described herein.

In another example, a method of operating an apparatus includes automated removing of workpieces arranged in a container, the automated removing including, detecting the workpieces via an object recognition device, gripping and removing the workpiece from the container via at least one gripper, and evaluating data of the object recognition device, planning a path, and controlling the gripper therein, and further setting up an apparatus in a modular manner with at least one handling module and at least one feed module, wherein the handling module has the gripper, and the feed module has an arrangement for providing a container having workpieces. The method may further include additional actions such as one or more, or each of, those described above herein.

The invention claimed is:

1. An apparatus for automated removal of workpieces arranged in a container that is set up in a modular manner, the apparatus comprising:
    a feed module, the feed module comprising an arrangement for providing the container containing workpieces, and where the feed module comprises an object recognition device for detecting the workpieces in the container; and
    a handling module comprising at least one gripper for gripping and removing the workpieces from the container, and each of the at least one grippers having a controller for evaluating data of the object recognition device, for path planning, and for controlling the gripper,
    wherein the handling module further comprises cell walls, where cell walls of the feed module and the cell walls of the handling module protect a working zone of the respective module from unauthorized access, the feed module and the handling module comprising mechanical connection points for connecting to one another,
    wherein the feed module and the handling module comprise an electrical interface, a pneumatic interface, or a hydraulic interface for connecting to one another, and
    wherein the arrangement for providing the container of the feed module is, when connected to the handling module, accessible from an outside of the cell walls on at least one side of the feed module for introduction of full containers into the feed module and for removal of empty containers from the feed module.

2. The apparatus in accordance with claim 1, wherein the apparatus further comprises an output module which has at least one workpiece placement area on which the workpieces are placed down in a separated manner or in a defined position, and wherein the output module includes a transport path for the workpieces.

3. The apparatus in accordance with claim 1, wherein the apparatus further comprises a machining or assembly module,
    wherein the machining or assembly module has a workpiece placement area at which the workpieces are placed down by a gripper of the at least one gripper of the handling module and has a machining or assembly unit which machines or assembles the workpieces, and
    wherein the machined or assembled workpieces are gripped by the gripper of the at least one gripper of the handling module and placed down onto a workpiece placement area of an output module.

4. The apparatus in accordance with claim 1, wherein one or more of the modules has/have one or more of cell frames, a base plate, and cell walls, and wherein the modules have the mechanical connection points for connecting to one another which are arranged at the cell frames.

5. The apparatus in accordance with claim 1, wherein the individual modules have additional interfaces including one or more of pneumatic interfaces and hydraulic interfaces for connecting to one another, and wherein the interfaces allow a coordination of an operation of the individual modules, and wherein an interface to a production control system is provided, where the interface to the production control system allows the coordination of the operation of the individual modules with a further production system.

6. The apparatus in accordance with claim 1, wherein the arrangement for providing the container having the workpieces of the feed module is accessible from the outside via a door, a light barrier, an automatic container feed path, or a container removal path.

7. The apparatus in accordance with claim 1, wherein the arrangement for providing the container having the workpieces of the feed module is supplied with containers via an automatic container feed path or removal path, wherein the arrangement for providing the container having the workpieces receives at least two containers, and wherein the feed module has a transport arrangement for transporting containers in an interior of the feed module, wherein the transport arrangement cooperates with the automatic container feed path or removal path or is combined with the automatic container feed path or removal path, and wherein a light barrier is provided which secures a feed zone.

8. The apparatus in accordance with claim 1, wherein the arrangement for providing the container having the workpieces of the feed module has a transverse shuttle which cooperates with a container feed path and with a container removal path each having opposite transport directions, or
wherein the arrangement for providing the container having the workpieces of the feed module has a rotary table on which the containers are arranged, wherein the containers are travelable by rotating the rotary table from a feed zone of the feed module into a working zone of the gripper of the handling module and vice versa, with the rotary table having separating walls which separate the feed zone from the working zone, or
wherein a transport path for containers leads through the feed module.

9. The apparatus in accordance with claim 1, wherein the feed module also takes over transporting off of the workpieces in addition to the providing of the containers, wherein only one transport path is provided on which both the containers are transported in and away from the handling module, and wherein only one transport path is provided on which separated or positioned workpieces are transported away from the handling module, wherein containers having unordered workpieces and palletizing baskets for receiving the separated or positioned workpieces are transported on the transport path, the palletizing baskets having nests for receiving the workpieces.

10. The apparatus in accordance with claim 1, wherein the apparatus further comprises a buffer station on which the gripper places down the workpieces after the removal from the container, where the workpieces are picked up from the buffer station by the gripper and placed down in an end placement area, where the buffer station is integrated into the handling module, or where the buffer station is arranged in a buffer module, or where the buffer station is arranged in an output module.

11. The apparatus in accordance with claim 1, wherein an output module comprises a palletizing cell or cooperates with a palletizing cell, wherein the workpieces are placed down in palletizing baskets of the palletizing cell, and
wherein the output module cooperates with a pallet handling system, wherein the output module corresponds to an equipping or feed module of the pallet handling system in a particular embodiment.

12. The apparatus in accordance with claim 1, further comprising a plurality of handling modules which cooperate with an output module, where the plurality of handling modules cooperate with the output module with a transport path for transporting away of separated workpieces from the handling module, and where the handling modules each having separate feed modules.

13. The apparatus of claim 1, wherein the feed module comprises a separating apparatus via which a feed zone for a first container and a feed zone for a second container are selectively separated from a working zone of the gripper, where the workpieces are gripped from the first container while the second container is separated from the working zone of the gripper and replaced from the outside.

14. The apparatus of claim 13, wherein a hood is provided which is arranged in the feed module, and wherein the hood is selectively arranged over the first and second containers to cover the first and second containers.

15. The apparatus of claim 1, comprising first and second handling modules and a buffer station on which a gripper of the first handling module places down workpieces after removal from the container, with the workpieces being picked up from the buffer station by a gripper of the second handling module and being placed down in a workpiece placement area.

16. The apparatus of claim 15, further comprising the buffer station being arranged in a buffer module arranged between the first and second handling modules.

17. A feed module comprising:
an arrangement for providing a container containing workpieces;
an object recognition device for detecting the workpieces in the container; and
an interface to a handling module comprising a gripper via which data of the object recognition device is transferred to a control of the gripper,
wherein the feed module further comprises cell walls protecting a working zone of the feed module from unauthorized access,
wherein the feed module comprises mechanical connection points for connecting to the handling module, and
wherein the arrangement for providing the container of the feed module is, when connected to the handling module, accessible from an outside of the cell walls on at least one side of the feed module for introduction of full containers into the feed module and for removal of empty containers from the feed module.

18. The feed module of claim 17, wherein the arrangement for providing the container having the workpieces of the feed module is accessible from the outside via a door, a light barrier, an automatic container feed path, or a container removal path.

19. The feed module of claim 17, comprising a separating apparatus via which a feed zone for a first container and a feed zone for a second container are selectively separated from a working zone of the gripper, where the workpieces are gripped from the first container while the second container is separated from the working zone of the gripper and replaced from the outside.

* * * * *